(12) United States Patent
Norris

(10) Patent No.: US 7,573,044 B2
(45) Date of Patent: Aug. 11, 2009

(54) REMOTE DETECTION OF EXPLOSIVE SUBSTANCES

(75) Inventor: Wayne B. Norris, Santa Barbara, CA (US)

(73) Assignee: BOSSdev, Inc., Troy, MI (US)

( * ) Notice: Subject to any disclaimer, the term of this patent is extended or adjusted under 35 U.S.C. 154(b) by 226 days.

(21) Appl. No.: 11/489,261

(22) Filed: Jul. 18, 2006

(65) Prior Publication Data

US 2008/0017806 A1  Jan. 24, 2008

(51) Int. Cl.
*G01N 23/00* (2006.01)

(52) U.S. Cl. .................................. 250/390.04
(58) Field of Classification Search .................. 250/300, 250/269.1–269.8, 390.01–390.12
See application file for complete search history.

(56) References Cited

U.S. PATENT DOCUMENTS

| | | | |
|---|---|---|---|
| 3,781,564 A * | 12/1973 | Lundberg | 250/505.1 |
| 3,832,545 A | 8/1974 | Bartko | |
| 4,529,571 A * | 7/1985 | Bacon et al. | 376/144 |
| 4,616,833 A * | 10/1986 | Geller | 463/51 |
| 4,851,687 A | 7/1989 | Ettinger et al. | |
| 5,006,299 A | 4/1991 | Gozani et al. | |
| 5,078,952 A | 1/1992 | Gozani et al. | |
| 5,080,856 A | 1/1992 | Grenier et al. | |
| 5,114,662 A | 5/1992 | Gozani et al. | |
| 5,124,554 A | 6/1992 | Fowler et al. | |
| 5,388,128 A | 2/1995 | Gozani | |
| 5,410,575 A | 4/1995 | Uhm | |
| 5,606,167 A | 2/1997 | Miller | |
| 5,847,398 A * | 12/1998 | Shahar et al. | 250/370.09 |
| 5,880,469 A | 3/1999 | Miller | |
| 5,982,838 A | 11/1999 | Vourvopoulos | |
| 6,215,122 B1 | 4/2001 | Clifford et al. | |
| 6,341,150 B1 * | 1/2002 | Ivanov et al. | 376/159 |
| 6,393,085 B1 | 5/2002 | Heller et al. | |
| 6,444,994 B1 * | 9/2002 | Ohmori et al. | 250/505.1 |
| 6,563,898 B1 | 5/2003 | Vourvopoulos et al. | |

(Continued)

FOREIGN PATENT DOCUMENTS

JP   02099811 A  *  4/1990

(Continued)

OTHER PUBLICATIONS

International Search Report mailed on Mar. 5, 2008, for PCT Application No. PCT/US2007/016249, filed on Jul. 17, 2007, five pages.

*Primary Examiner*—David P Porta
*Assistant Examiner*—Kiho Kim
(74) *Attorney, Agent, or Firm*—Dickinson Wright PLLC (57) ABSTRACT

Apparatus and method for detecting and locating hidden explosive substances. The detection apparatus includes a thermal neutron beam generator, a gamma ray detector, data collection module and sensors, and a detection processing module. The thermal neutron beam generator includes a fast neutron source, a neutron moderator to slow the fast neutrons to thermal neutrons, and a rotatable neutron shield enclosing the generated thermal neutrons. The rotatable neutron shield has an aperture through which a thermal neutron beam is projected at a remote target. Gamma rays radiating from hidden explosives in the remote target are detected by the gamma ray detector, while the associated detection processing module spatially locates the target based at least in part on the position of the aperture in the rotatable neutron shield.

71 Claims, 3 Drawing Sheets

U.S. PATENT DOCUMENTS

| | | |
|---|---|---|
| 6,928,131 B2 | 8/2005 | Olshansky et al. |
| 2002/0131543 A1 | 9/2002 | Leung |
| 2004/0228433 A1* | 11/2004 | Magill et al. ................. 376/347 |
| 2006/0210007 A1* | 9/2006 | Koskelo et al. ............. 376/156 |
| 2007/0295911 A1* | 12/2007 | Sved ....................... 250/359.1 |

FOREIGN PATENT DOCUMENTS

| | | |
|---|---|---|
| JP | 2001051094 A * | 2/2001 |
| WO | WO-01/94984 A2 | 12/2001 |
| WO | WO-01/94984 A3 | 12/2001 |
| WO | WO-03/040713 A1 | 5/2003 |
| WO | WO-2004/043740 A2 | 5/2004 |
| WO | WO-2004/043740 A3 | 5/2004 |
| WO | WO-2005/008285 A1 | 1/2005 |
| WO | WO-2006/016835 A1 | 2/2006 |

* cited by examiner

REMOTE DETECTION OF EXPLOSIVE SUBSTANCES

FIELD OF THE INVENTION

The present disclosure relates generally to the detecting of explosive substances, and more particularly to the detecting of explosive substances within remote targets and the locating of such targets.

BACKGROUND

An improvised explosive device (IED) is an explosive device placed or fabricated in an improvised manner, often used in unconventional warfare by terrorists or guerrillas. These IEDs are sometimes referred to as roadside or car bombs. The ever-increasing need to protect soldiers and civilians alike has resulted in demand for explosives detection systems that can detect and locate an IED at a significant standoff distance—far enough from the IED's kill radius.

It is well known that explosives can be detected by bombarding them with thermal or slow neutrons of kinetic energy levels of approximately 0.026 eV, then detecting the resulting gamma rays. The vast majority of conventional chemical explosives are nitrogen-14 ($^{14}$N) rich, while Special Nuclear Materials (SNMs) may contain Plutonium-239 ($^{239}$Pu), Uranium-235 ($^{235}$U), or both as key ingredients. These constituent elements, $^{14}$N, $^{239}$Pu, and $^{235}$U, among others, each radiates its characteristic gamma ray emission spectrum when dosed with thermal neutrons.

Figure 1:
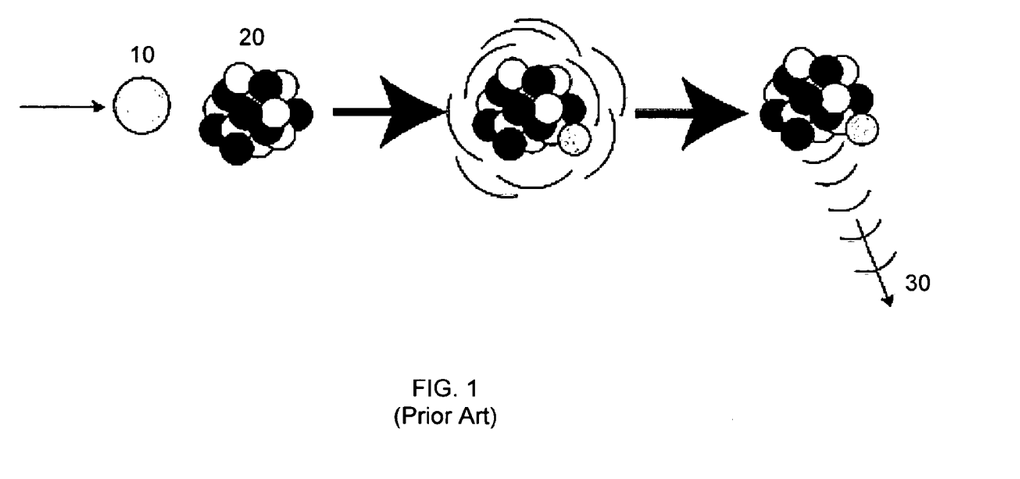
FIG. 1 (prior art) shows an inbound thermal neutron impacting a nitrogen-14 nucleus.

For instance, militarily significant conventional chemical explosives, which constitute by far the largest threat to human life in terms of the frequency of occurrence, historical lethality, and ease of procurement and use, contain very high densities of nitrogen, principally nitrogen-14. Nitrogen-14 20, when bombarded by a thermal neutron 10, emits a strong gamma ray 30 at 10.83 MeV as follows (also shown graphically in prior art FIG. 1):

$$^{14}N + {}^1n \rightarrow {}^{15}N + \gamma$$

The gamma ray emission is isotropic in that it can be emitted in any direction and its trajectory is uncorrelated to the trajectory of the incident thermal neutron. High gamma ray fluxes are interpreted as explosives detection events, and this technique is known as Thermal Neutron Activation Analysis (TNAA).

TNAA is a well-known technique for explosives detection and other types of materials analysis. However, the majority of TNAA technology has been directed at explosives detection in luggage and at landmine detection. Both applications operate in environments with complicating factors that limit the success of TNAA. Many common items found in luggage, such as nylon sweaters, are rich in nitrogen. This reduces the signal-to-noise ratio (SNR), which increases the false alarm rate and lowers the overall detection rate. Explosives distributed in small pieces in luggage also reduce the SNR and the detection rate in TNAA. Likewise, the most significant issue with landmine and buried explosives detection is the presence of significant amounts of silicon, which emits gamma rays at 10.6 MeV under thermal neutron dosing. This strong emission (noise) competes with the gamma rays from nitrogen at 10.83 MeV (signal), reducing the SNR, increasing the false alarm rate, and decreasing the overall detection rate. Furthermore, the reduced SNR in both applications translates into increased inspection times and decreased throughout.

By contrast, in accordance with embodiments of the present invention, the proposed use of TNAA for IED detection operates in more conducive environments. First, the most deadly IEDs contain significant amounts of nitrogen. Thus, the targeted signal is high compared to competing signals from other noise sources of nitrogen. This has the effect of improving the SNR, decreasing the false alarm rate, and increasing the overall detection rate. Second, IEDs are often placed at or above the ground; they are often buried in trash piles or placed near concrete or dirt roads. Although silicon is present in these environments, its effect is significantly smaller than that in the below ground environment. A typical IED is a command detonated device whose primary component is one or more HE (high explosive) 155 mm (U.S.) or 152 mm (Soviet) (diameter) artillery rounds consisting of a metal casing filled with high explosive and measuring about 450 mm long.

More importantly, there is presently no device for effectively detecting and locating IEDs at a standoff distance. Landmine detection and explosives detection in luggage both examine targets at proximity. Therefore, a further object of the present invention is to detect IEDs using TNAA under different conditions, and thereby significantly reduce friendly and civilian casualties. Still further objects and advantages will become apparent from a consideration of the ensuing description and drawings.

SUMMARY

The present invention is directed to an apparatus and methods for effectively detecting and locating explosive substances within remote targets, such as an IED including an artillery round, but not so limited. One major advantage afforded by embodiments of the present invention is that IEDs, including roadside and car bombs, may be detected and located at a standoff distance (e.g. at least 5 meters, 10 meters, or further), thereby reducing casualties and deterring future IED attacks, especially in civilian areas. For instance, a portable detection apparatus in accordance with the present invention may be mounted on a vehicle such that explosive materials could be identified safely and effectively on a routine patrol.

Briefly, the disclosed detection apparatus includes a thermal neutron beam generator, a gamma ray detector, a plurality of data collection modules and sensors, and a detection processing module. The thermal neutron beam generator comprises a fast neutron source, a neutron moderator to slow the fast neutrons to thermal neutrons, and a rotatable neutron shield enclosing the generated thermal neutrons. The neutron shield has an aperture to form a thermal neutron beam directed at a remote target. If the remote target contains explosive substances, gamma rays radiate isotropically from the remote target when it is bombarded by the thermal neutrons. A portion of these gamma rays are intercepted and detected by the gamma ray detector, which is spaced a few meters apart from the thermal neutron source in order to minimize the neutron-irradiated air path seen by the detector, thereby reducing background noise. This arrangement is known as a "bistatic" orientation. Finally, the detection processing module determines whether the remote target contains explosive substances and further locates the target by processing the collected data from the gamma ray detector and the position sensor associated with the neutron shield. More specifically, the position sensor associated with the neutron shield transmits the azimuth and elevation of the aperture to the detection processing module, which in turn determines the thermal neutron beam direction and the remote target's location.

Embodiments of the present invention include a second rotatable neutron shield defining a second aperture. The two apertures are each oriented in a different axis, and each neutron shield may rotate independently at different speeds or remain fixed. This arrangement provides further control and fine tuning of the thermal neutron beam's direction, its scanning speed, and its dimensions.

Embodiments of the present invention include other features, including but not limited to neutron amplifiers, neutron focusing elements, neutron beam-forming components, distance or imaging sensors, and a pixilated detector.

DETAILED DESCRIPTION

Figure 2:
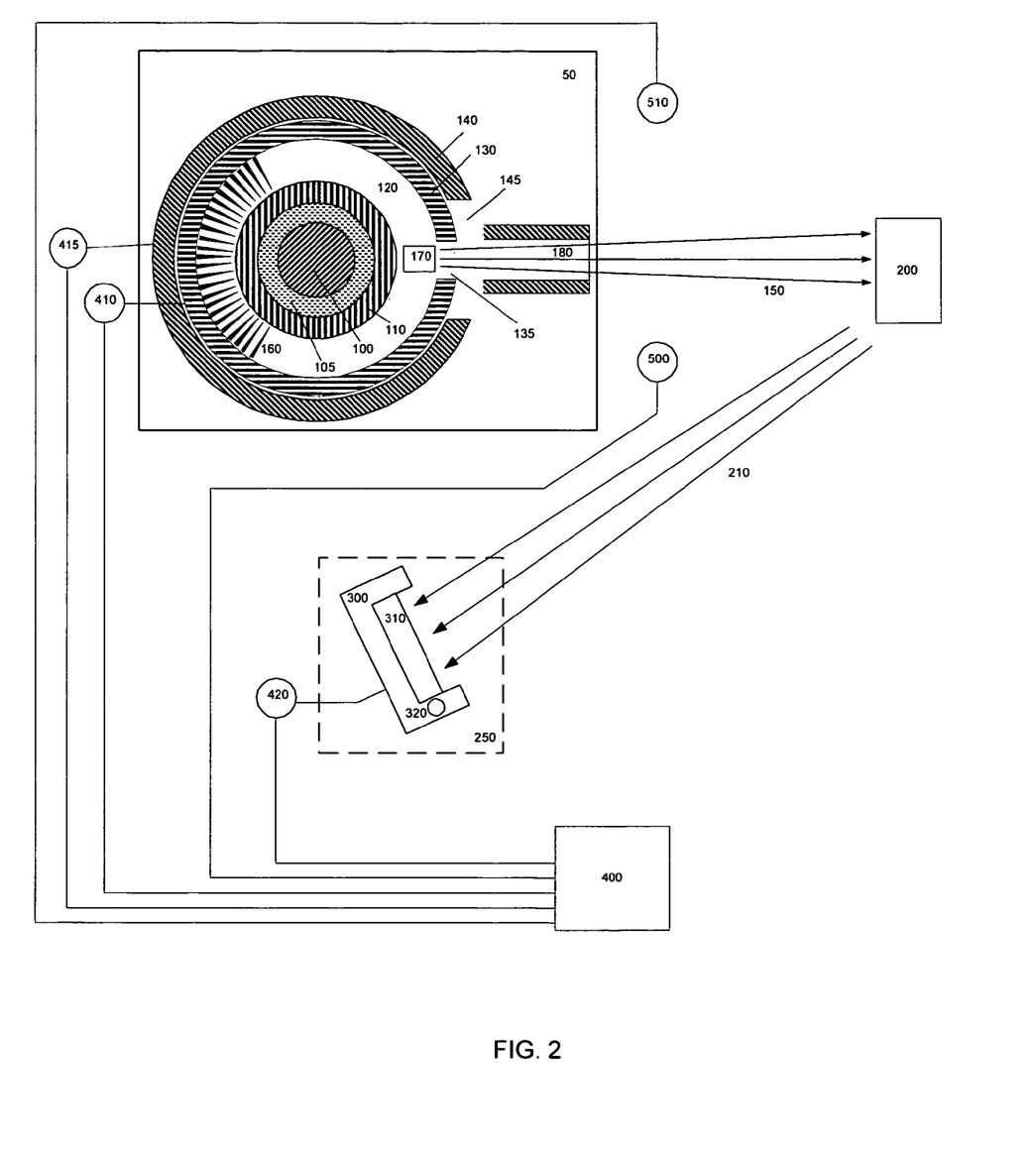
FIG. 2 shows an apparatus for detecting remote explosive substances in accordance with this disclosure.

FIG. 2 illustrates graphically an apparatus for detecting remote explosive substances in accordance with the present invention. (Conventional elements, such as housings, mountings, supports, electrical power supplies, etc. are omitted for ease of illustration.) The apparatus has four main components: a thermal neutron beam generator 50, which directs a thermal neutron beam 150 towards a remote suspicious target 200 (not part of the apparatus, of course), a gamma ray detector 250, a plurality of data collection modules and sensors, and a detection processing module 400. These four main components are first broadly described by their sub-components, and then each sub-component is described in detail.

Reference herein to "one embodiment," "an embodiment," "some embodiments," or similar formulations, means that a particular feature, structure, operation, or characteristic described in connection with those embodiments, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

A main component of the apparatus is thermal neutron beam generator 50, which directs a thermal neutron beam 150 towards the remote suspicious target 200. As shown in FIG. 2, a fast neutron source 100 is surrounded by a neutron amplifier 105, which increases the number of fast neutrons prior to their moderation. The neutron amplifier 105 is surrounded by a neutron moderator 110, which slows the fast neutrons to thermal neutrons. A rotatable neutron shield 130 and a second optional rotatable neutron shield 140 enclose a void 120, with the neutron moderator 110, neutron amplifier 105, and the fast neutron source 100 within. Located in the void 120 is a neutron focusing element 160. Each of the rotatable neutron shields 130 and 140 defines an aperture, apertures 135 and 145 respectively, which directs the thermal neutrons to form a thermal neutron beam 150 directed at the remote target 200. A thermal neutron amplifier 170 at the aperture 135 increases the number of thermal neutrons in the thermal neutron beam 150 when the thermal neutron beam 150 passes through the thermal neutron amplifier 170. A neutron beam-forming component 180 situated along a path of the thermal neutron beam 150 further focuses the thermal neutron beam 150.

A second main component is gamma ray detector 250, which detects gamma rays 210 emitted from the remote target 200, and which is spaced apart from the thermal neutron beam generator 50. As shown in FIG. 2, substances of interest within the remote target 200 radiate a characteristic gamma ray emission spectrum when bombarded by thermal neutrons. A portion of these gamma rays 210 are intercepted by a gamma ray spectrometer 310, which is protected from nuisance gamma rays originating from sources other than the remote target 200 by a gamma ray shield 300.

A third main component includes in this example two position sensors 410 and 415, an imaging sensor (video camera) 500, a distance sensor 510, and a detection data collection module 420. The two position sensors 410 and 415, determine the positions of the two apertures 135 and 145, respectively. Each of the two position sensors 410 and 415, the imaging sensor 500, and the distance sensor 510 collects and transmits its data to the detection processing module 400. The detection data collection module 420 collects and transmits the data from the gamma ray detector 250 to the detection processing module 400.

A fourth main component is detection processing module 400, which processes data, including but not limited to position data provided from the two position sensors 410 and 415, the imaging sensor 500, the distance sensor 510, and the detection data collection module 420. Based on the provided data, the detection processing module 400 determines whether the remote target 200 contains any substances of interest, as well as the location of the remote target 200.

As shown in FIG. 2, a fast neutron source 100 is preferred because it is portable, simple to construct, and a convenient source of significant neutron flux. However, other alternative neutron sources may be contemplated. For portable field operations, the maximum dimension of the neutron source should be minimized. Numerous types of known fast neutron sources have a maximum dimension smaller than approximately 100 cm as is desirable here. There are also several available kinds of fast neutron sources, including but not limited to spontaneous fission, sealed tube, alpha reaction, photofission, and plasma pinch. Some embodiments have spontaneous fission neutron sources using radioactive isotopes, such as Californium-252. In some embodiments, neutrons are produced by sealed tube or accelerator-based neutron generators. These generators create neutrons by colliding deuteron beams into light-isotope heavy hydride targets, such as lithium or lithium deuteride, causing fusion with attendant release of neutrons. Some embodiments have alpha reaction sources, in which alpha particles from alpha-radioactive isotopes, such as polonium or radium, are directed into targets made of low-atomic-mass isotopes, such as beryllium, carbon, or oxygen. An embodiment may also use photofission sources, including beryllium, in which gamma rays are directed into nuclei capable of emitting neutrons under certain conditions. Another kind of neutron source is the plasma pinch neutron source or fusor-source, in which a gas containing deuterium, tritium, or both is squeezed into a small volume plasma, resulting in controlled nuclear fission with attendant release of neutrons. Pulsed neutron generators using the fusor technique are also commercially available. One particular type of pulsed neutron generator has the capability to generate fast neutron pulsed fluxes having a neutron yield of up to $3 \times 10^{10}$ neutrons per second. The advantage of such a neutron source is that it can be switched off, but the disadvantage is that it has to be electrically powered. Typically, these pulsed neutron generators are in the form of a tube about 2-5 cm in diameter and 1 meter long. Therefore, they are reasonably portable.

As shown in FIG. 2, the fast neutron source 100 is surrounded by a conventional neutron amplifier 105, which increases the number of fast neutrons prior to their moderation by the neutron moderator 110. Neutron amplifiers emit more neutrons than they absorb when irradiated by neutrons. Known materials used as neutron amplifiers include, but are not limited to, thorium, lead, beryllium, americium, and non-weapons-grade uranium and plutonium. Since the most common neutron amplifiers operate on high energy neutrons, some embodiments may include one or more high energy neutron amplifiers or pre-moderator amplifiers, thereby maximizing the number of neutrons in the neutron beam for a given power dissipation, physical size, cost, and weight. Other neutron amplifiers operate on thermal energy neutrons. Therefore, some embodiments may include a thermal neutron or post-moderator amplifier as well, which is described below.

Because the neutrons produced by the fast neutron source and the optional pre-moderator amplification stage have energies tens to hundreds of millions of times larger than the energies required for the present apparatus, the neutrons are slowed down to thermal energies—energies in thermal equilibrium with nominally room temperature surroundings (~0.026 eV)—by the neutron moderator 110. This process is known as neutron moderation or thermalization.

Neutron moderation is conventionally achieved by scattering or colliding the neutrons elastically off light nuclei that do not absorb them. Since the light nuclei are of the same rough order of magnitude in mass as the neutrons themselves, each neutron imparts significant energy to each nucleus with which it collides, resulting in rapid energy loss by the neutrons. When the neutrons are in thermal equilibrium with their surroundings, a given neutron is just as likely to get an energy boost from a slightly faster-than-average molecule as it is to lose a slight amount of energy to a slightly slower-than-normal molecule. As a result, thermal neutrons remain thermal. Among the most effective moderators are deuterium and graphite, since they are light and do not absorb appreciable number of neutrons.

As shown in FIG. 2, neutron moderation is achieved by passing the fast neutrons through the neutron moderator 110. Some of the neutron sources mentioned above produce neutron beams (anisotropic sources), while others produce neutrons with trajectories radiating equally in all directions (isotropic sources). Nevertheless, the effect of moderation, with its millions of elastic scattering events per moderated neutron, yields a fairly isotropic distribution of neutron trajectories. For this reason, the optimum shape for the neutron moderator 110 is a hollow sphere with the fast neutron source 100 and the optional pre-moderator amplifier 105 inside. For a deuterium oxide moderator, the thickness required to moderate deuterium-deuterium fusor-source neutrons having energies of the order of 2.5 MeV to thermal energies is of the order of 11 cm; for a graphite moderator, the thickness is of the order of 20 cm. See, e.g. G. Friedlander et al, *Nuclear and Radiochemistry* (3d ed., Wiley and Sons 1981).

Simply sending thermal neutrons into space in all directions would not allow a target of interest to be located spatially. For this reason, it is useful to scan the surrounding landscape with thermal neutron beam 150. The thermal neutron beam 150 is formed by enclosing the neutron moderator 110 with a rotatable neutron shield 130 defining an aperture or reticule 135, which could be variable in size. The neutron shield 130 is of one or more substances known to absorb neutrons, such as boron, lithium, cadmium, hafnium, or gadolinium. Boron is one of the most suitable materials for the neutron shield 130 in this invention, since it does not produce gamma radiation after absorbing a neutron, whereas other isotopes do. In some embodiments, a stationary neutron shield 130 with a rotatable aperture 135 is used. Embodiments also include a second rotatable neutron shield 140 defining a second aperture 145, as shown in FIG. 2. Although the two apertures 135 and 145, are shown in the figure as being aligned with each other, typically they are each oriented in a different axis. In addition, each neutron shield may rotate independently at different speeds or remain fixed.

The void 120 and the neutron focusing element 160 conserve the thermal neutrons and thus maximize the number of thermal neutrons in the thermal neutron beam 150. Thermal neutrons radiate isotropically; that is, they radiate in all directions, into a solid angle of $4\pi$ stearadians—the solid angle of a sphere. However, the goal is to produce a fairly narrow thermal neutron beam, e.g. of the order of 0.1 radians wide and 0.3 radians high, or approximately 0.03 stearadians. As a result, most of the neutrons are wasted—approximately 399 out of 400 of them. Therefore, the present apparatus may use one or more techniques to focus the neutrons, so as to conserve potentially wasted neutrons. To accommodate such focusing, the apparatus includes an optional void 120, which is nearly zero to many centimeters thick. In recent years, numerous schemes for creating thermal neutron lenses have been described, including but not limited to capillary optics, silicon lenses, beryllium diffraction lenses, and nickel reflectors. The apparatus may use one or more of such neutron focusing elements to conserve neutrons. The exemplary focusing element depicted in FIG. 2 is a beryllium diffraction lens 160.

The neutron amplifier 170 at the aperture 135 increases the number of thermal neutrons in the thermal neutron beam 150. Certain elements, such as thorium, emit more thermal neutrons than they absorb when dosed with thermal neutrons, effectively acting as neutron amplifiers. Therefore, the present invention may optionally include a neutron amplifier 170 to further enhance its performance.

The neutron beam-forming component 180 focuses the thermal neutron beam 150 more precisely. Neutron beam-forming components can be made with materials, such as nickel, that reflect neutrons at very low incident angles. The present invention may include a tubular or other similarly shaped neutron beam-forming component 180 to further enhance its performance.

As shown in FIG. 2, the thermal neutron beam 150 is directed towards a remote target 200 containing explosive materials with, in this case, large amounts of nitrogen. Although some of the thermal neutrons are scattered or reflected by air, a significant portion of the thermal neutrons is estimated by simulation to reach a remote target tens of meters away. Thermal neutrons penetrate, to at least some degree, virtually all materials commonly found to shield explosives, including steel, glass, and many materials containing plastics and concrete. For instance, to reduce the flux of an incident thermal neutron beam by half would require a thickness of approximately 1 cm of steel, 15 cm of lead, 3 cm of aluminum, 40 cm of glass, or 25 cm of water. As a result of the thermal neutron bombardment, gamma rays 210 radiate isotropically from the remote target 200. These fairly high energy 10.83 MeV gamma rays 210 also penetrate, to at least some degree, virtually all materials commonly found to shield explosives.

A portion of these gamma rays 210 are intercepted by a gamma ray spectrometer (detector) 310 capable of counting gamma rays with energies above 10 MeV. The spectrometer 310 is protected from nuisance gamma rays originating from sources other than the remote target 200 by a gamma ray detector shield or collimator 300, constructed of lead or other gamma ray shielding substances. The gamma ray spectrometer 310 typically resolves gamma ray energies in the 10-11

MeV range with a minimum precision of ±0.5% of the gamma ray energy in order to distinguish between return gamma rays from different substances of interest. Portable gamma ray spectrometers capable of resolving energies at that level and with that precision are generally constructed of high purity germanium, with a minimum thickness of 10 cm. However, detectors constructed of other materials may also be used. The typical method by which gamma rays are detected in these spectrometers is a combination of Compton scattering and conventional scintillation.

Compton scattering consists of electron-positron pair production by the incident gamma ray as it passes the environment of a nucleus. Each Compton event causes the gamma ray to lose approximately 1.022 MeV of energy, since this amount is the rest mass of the electron-positron pair produced. Positrons rapidly annihilate with electrons found in the detector, producing a pair of 522 KeV gamma rays that can be detected with a conventional solid-state scintillation counter. The residual energy from the incident gamma ray is also detected in the same way. The relative number and intensity of the scintillations allows for computing energy and flux by using modulo-remainder arithmetic.

The incident 10.83 MeV gamma rays conserve most of their momentum between Compton events, thereby leaving a track through the thick detector material. The conservation of momentum described above enables some embodiments to determine the incident angle of a detected gamma ray by using a pixilated detector 320, which senses the angular direction of the pair-production track left by the gamma ray.

If a gamma ray spectrometer 310 constructed of high purity germanium is used, it should preferably have a minimum thickness of 10 cm, so that gamma rays do not exit the counter before encountering 10 to 11 Compton events prior to being detected with their residual energy. Alternatively, the detector may be constructed of a multiplicity of thinner elements. The front surface area of the gamma ray spectrometer 310 is sized so as to detect sufficient quantities of incoming gamma rays in a short enough time to allow for target discrimination in less than 1 second.

As shown in FIG. 2, the gamma ray spectrometer 310 is spaced, for example, 3 meters apart from the thermal neutron source in order to minimize the neutron-irradiated air path seen by the spectrometer, thereby reducing background signal. The term for this arrangement is "bistatic" orientation. The spectrometer, neutron source, and the neutron shielding are typically mounted on a rotatable mast or support on a vehicle.

Simulations show that a thermal neutron beam of $3 \times 10^{10}$ neutrons per second will detect a 10 kilogram conventional explosive target 20 meters away in ⅓ of a second with an SNR of 1.5, using a detector with a frontal area of ½ meter by ½ meter. The apparatus may work at ranges up to 50 meters.

In order to determine whether the remote target 200 contains any explosives, the gamma ray detection data collection module 420 collects and transmits the detected gamma ray data as a function of time from the gamma ray spectrometer 310 to the detection processing module 400. To further locate the remote target 200, the position sensors 410 and 415, collect and transmit the positions of the two apertures 135 and 145, as a function of time to the detection processing module 400 for further processing. The positions of the apertures may be defined by an azimuth and an elevation, and may be used by the detection processing module 400 to determine the thermal neutron beam direction.

In some embodiments, the detection processing module 400 may determine the elevation and azimuth of the remote target 200 based on the determined thermal neutron beam direction. Optionally, a radar or other distance sensor 510 may be used to further identify the remote target's approximate position based on the estimated distance, elevation, and azimuth.

Another way to identify the remote target's approximate position is by projecting the thermal neutron beam direction and the incident angle of the detected gamma rays as determined by the pixilated detector 320. If the two projected lines do not intersect, then the detected gamma rays are likely nuisance gamma rays originating from sources other than the remote target, and the detection processing module 400 may ignore the detection as a background event. If the two projected lines intersect each other, the intersecting point is the estimated position of the suspicious target. In addition, images from the optional imaging sensor 500 may be used by the operator to rule out false detection in situations where the estimated position falls into a region of open space, thereby reducing the false alarm rate of the apparatus. In such situations, the detected gamma rays are likely attributed to atmospheric nitrogen rather than an object containing explosives.

The detection processing module 400 may also use pattern recognition (via sensor 500) or other techniques to take into consideration other factors, such as time of detection, flight time of the neutrons and gamma rays, and background noise levels. These data may further be converted to tactical decisions according to the user's concept of operations.

Figure 3:
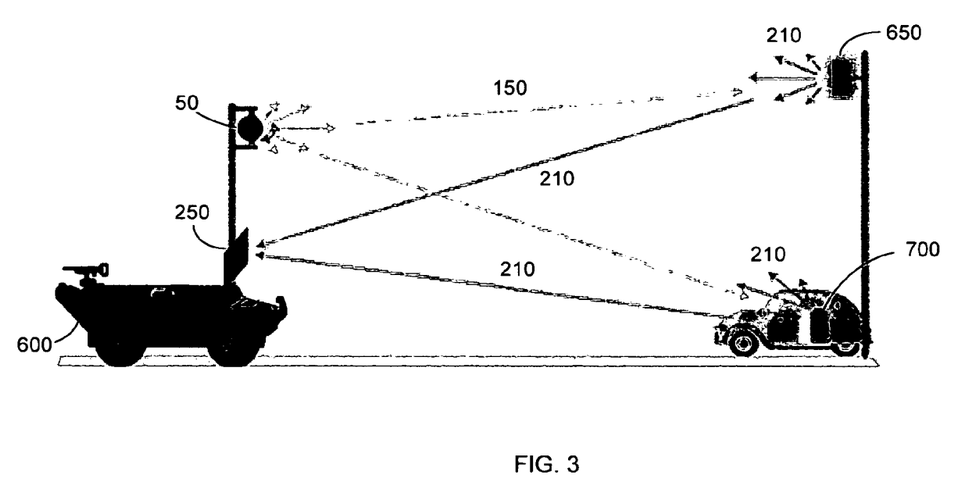
FIG. 3 shows an armored vehicle with the apparatus of FIG. 2 scanning for IEDs at a standoff distance.

As shown in FIG. 3, a detection apparatus as described above including elements 50 and 250 and others (not shown) of FIG. 2 mounted on a rotating mast and projecting neutron beam 150 (shown at two positions) and receiving gamma rays 210 for use may be mounted on a manned or remotely controlled vehicle 600 (as moved or otherwise) traveling e.g. at the head of a convoy to detect IEDs 650 (hidden on a utility pole) and 700 (car bomb) at standoff or near-standoff range—far enough ahead to allow for a traffic halt or evasive maneuvers prior to entering the IED's kill radius.

While the present invention has been described in terms of the above-described embodiments, those skilled in the art will recognize that the invention is not limited to the embodiments described. The present invention may be practiced with various modifications and alterations within the spirit and scope of the appended claims.

What is claimed is:

1. Apparatus for detecting nitrogen or other substances of interest within a remote target and for locating the target, comprising:

a thermal neutron source;

a mount for supporting the thermal neutron source on a vehicle;

a first neutron shield which encloses the thermal neutron source and defines a first aperture through which a thermal neutron beam is directed at the remote target, the first neutron shield being movably supported relative to the mount so that the thermal neutron beam projecting through the first aperture can be scanned across a wide search area;

a gamma ray detector configured to detect gamma rays produced by interaction of the thermal neutron beam with nitrogen or other substances of interest within the target and to collect data relating to the detected gamma rays;

a first sensor associated with the first neutron shield and configured to determine the position of the first aperture; and a detection processing module operatively coupled to the first sensor and the detector and which associates the determined position of the first aperture at the moment the collected data indicates nitrogen or other substances of interest within the target so as to spatially locate the target.

2. The apparatus of claim 1, wherein the thermal neutron source includes a source of fast neutrons.

3. The apparatus of claim 2, wherein the source of fast neutrons is at least partly enclosed by a moderator which slows the fast neutrons.

4. The apparatus of claim 3, further including a neutron amplifier at least partly enclosed by the moderator, thereby increasing the number of fast neutrons.

5. The apparatus of claim 3, wherein the moderator contains at least one of deuterium or graphite.

6. The apparatus of claim 3, wherein the moderator is a hollow sphere enclosing the source of fast neutrons.

7. The apparatus of claim 1, wherein the first neutron shield contains at least one substance to absorb neutrons.

8. The apparatus of claim 7, wherein the substance is at least one of boron, lithium, cadmium, hafnium, or gadolinium.

9. The apparatus of claim 1, wherein the first neutron shield encloses the thermal neutron source with a void defined there between.

10. The apparatus of claim 9, wherein the first neutron shield encloses at least one neutron focusing element located in the void.

11. The apparatus of claim 10, wherein the neutron focusing element is at least one of a capillary optic, a silicon lens, a beryllium diffraction lens, or a nickel reflector.

12. The apparatus of claim 1, wherein the first neutron shield is rotatable to direct the thermal neutron beam from the first aperture towards the target.

13. The apparatus of claim 1, further comprising a rotatable support on which the thermal neutron source, the first neutron shield, and the gamma ray detector are mounted.

14. The apparatus of claim 1, further including a second neutron shield defining a second aperture and at least partly enclosing the first neutron shield, such that the thermal neutron beam is directed at the remote target via the second aperture.

15. The apparatus of claim 14, wherein the second neutron shield contains at least one substance to absorb neutrons.

16. The apparatus of claim 15, wherein the substance is at least one of boron, lithium, cadmium, hafnium, or gadolinium.

17. The apparatus of claim 14, wherein the second neutron shield is rotatable to further direct the thermal neutron beam from the second aperture towards the target.

18. The apparatus of claim 14, further comprising a rotatable support on which the thermal neutron source, the first and the second neutron shields, and the gamma ray detector are mounted.

19. The apparatus of claim 14, further including a second sensor associated with the second neutron shield to determine the position of the second aperture.

20. The apparatus of claim 19, wherein the determined position of the second aperture is defined by an azimuth and an elevation.

21. The apparatus of claim 19, wherein the detection processing module locates the target by determining the thermal neutron beam direction using the determined positions of the first and second apertures.

22. The apparatus of claim 1, further including a thermal neutron amplifier associated with the thermal neutron source and which increases the number of thermal neutrons in the thermal neutron beam when the thermal neutron beam passes through the thermal neutron amplifier.

23. The apparatus of claim 22, wherein the thermal neutron amplifier contains at least one of thorium, uranium, plutonium, or americium.

24. The apparatus of claim 1, further including a neutron beam-forming component associated with the thermal neutron source and which focuses the neutrons onto the target.

25. The apparatus of claim 24, wherein the neutron beam forming component contains nickel.

26. The apparatus of claim 1, wherein the gamma ray detector resolves gamma ray energies within a predetermined range with a predetermined precision.

27. The apparatus of claim 1, wherein the gamma ray detector is spaced apart from the thermal neutron source in a bistatic arrangement thereby to minimize detected backscatter of neutrons along a path of the thermal neutron beam, thereby reducing background noise.

28. The apparatus of claim 1, wherein the gamma ray detector has a front surface area sufficient to detect a plurality of gamma rays from the target within one second.

29. The apparatus of claim 1, further including a gamma ray shield which partly encloses the gamma ray detector.

30. The apparatus of claim 1, wherein the gamma ray detector is a pixilated detector which determines an incident angle of the detected gamma rays.

31. The apparatus of claim 1, further including a detection data collection module coupled to the gamma ray detector and to the detection processing module and which transmits the collected data to the detection processing module.

32. The apparatus of claim 1, further including an imaging sensor coupled to the detection processing module and which transmits the imaging data to the detection processing module.

33. The apparatus of claim 1, wherein the determined position of the first aperture is defined by an azimuth and an elevation.

34. The apparatus of claim 1, wherein the detection processing module locates the target by determining the thermal neutron beam direction using the determined position of the first aperture.

35. The apparatus of claim 1, wherein the apparatus detects the nitrogen or other substances of interest within the target which is at a distance at least 5 meters remote from the thermal neutron source and the gamma ray detector.

36. The apparatus of claim 35, wherein the apparatus detects a target comprising a body of explosive material at least 120 mm in diameter and 350 mm in length, at a distance at least 10 meters remote.

37. A method of detecting nitrogen or other substances of interest within a remote target and locating the target, comprising the steps of:

generating thermal neutrons with a thermal neutron generator;

shielding some of the generated thermal neutrons with a first shield;

directing some of the thermal neutrons through a first aperture in the first shield to form a thermal neutron beam projected at the remote target;

producing gamma rays by interaction of the thermal neutron beam with nitrogen or other substances of interest within the target;

detecting the gamma rays with a detector spaced from the first shield;

collecting data related to the detected gamma rays;

movably supporting the first shield relative to the detector so that the thermal neutron beam projecting through the first aperture can be scanned across a wide search area;

determining the position of the first aperture with a first sensor; and processing the determined position of the first aperture at the moment the collected data indicates nitrogen or other substances of interest so as to spatially locate the target.

38. The method of claim 37, wherein the act of generating thermal neutrons includes:

generating fast neutrons; and at least partly moderating the fast neutrons to slow the fast neutrons.

39. The method of claim 38, further comprising the act of amplifying the number of fast neutrons prior to moderating the fast neutrons.

40. The method of claim 38, wherein the moderating uses at least one of deuterium or graphite.

41. The method of claim 38, wherein the moderating uses a hollow sphere enclosing the fast neutrons.

42. The method of claim 37, wherein the act of shielding includes absorbing thermal neutrons traveling in directions other than that of the thermal neutron beam.

43. The method of claim 42, wherein the act of absorbing the thermal neutrons is performed by using at least one of boron, lithium, cadmium, hafnium, or gadolinium.

44. The method of claim 37, wherein the act of shielding includes creating a void such that the thermal neutrons travel therewithin.

45. The method of claim 44, further comprising the act of providing at least one neutron focusing element in the void, thereby conserving the thermal neutrons.

46. The method of claim 45, wherein the neutron focusing element is at least one of a capillary optic, a silicon lens, a beryllium diffraction lens, or a nickel reflector.

47. The method of claim 37, further comprising the act of rotating the thermal neutron beam to direct the thermal neutron beam towards the target.

48. The method of claim 37, further comprising the act of rotating a source of thermal neutrons and a detector for detecting the gamma rays.

49. The method of claim 37, further comprising the act of providing a neutron shield defining a second aperture, such that the thermal neutron beam is further directed at the remote target via the second aperture.

50. The method of claim 49, further comprising providing additional neutron shielding for further absorbing the thermal neutrons traveling in directions different from that of the thermal neutron beam.

51. The method of claim 50, wherein the act of further absorbing the thermal neutrons is performed by using at least one of boron, lithium, cadmium, hafnium, or gadolinium.

52. The method of claim 49, further comprising the act of rotating the additional neutron shielding to further direct the thermal neutron beam towards the target.

53. The method of claim 49, further comprising the act of rotating a source of the thermal neutrons, the additional neutron shielding, and a detector for detecting the gamma rays.

54. The method of claim 49, further comprising the act of determining the position of the second aperture.

55. The method of claim 54, wherein the act of determining the position of the second aperture includes defining the position by an azimuth and an elevation.

56. The method of claim 54, further comprising the act of locating the target by determining the thermal neutron beam direction using the determined positions of the first and second apertures.

57. The method of claim 37, further comprising the act of amplifying the number of thermal neutrons prior to directing the thermal neutrons to form a thermal neutron beam.

58. The method of claim 57, wherein the act of amplifying the thermal neutrons is performed using at least one of thorium, uranium, plutonium, or americium.

59. The method of claim 37, further comprising the act of providing a neutron beam-forming component situated along a path of the thermal neutron beam, thereby focusing the thermal neutron beam onto the target.

60. The method of claim 59, wherein the neutron beam-forming component contains nickel.

61. The method of claim 37, wherein the act of detecting gamma rays includes resolving gamma ray energies within a predetermined range with a predetermined precision.

62. The method of claim 37, wherein the act of detecting gamma rays is performed at a position apart from a shield for shielding the thermal neutrons in a bistatic arrangement, thereby minimizing detected backscatter of neutrons along a path of the thermal neutron beam.

63. The method of claim 37, wherein the act of detecting gamma rays includes detecting a plurality of gamma rays from the target within a predetermined time.

64. The method of claim 37, wherein the act of detecting gamma rays includes the act of shielding gamma rays originating from sources other than the target.

65. The method of claim 37, wherein the act of detecting gamma rays includes the act of determining the incident angle of the detected gamma rays on a detector for detecting the gamma rays.

66. The method of claim 37, wherein the act of collecting data of the detected gamma rays includes transmitting the collected data for further processing.

67. The method of claim 37, further comprising the act of collecting and transmitting imaging data for further processing.

68. The method of claim 37, wherein the act of determining the position of the first aperture includes defining the position by an azimuth and an elevation.

69. The method of claim 37, further comprising the act of locating the target by determining the thermal neutron beam direction using the determined position of the first aperture.

70. The method of claim 37, wherein the method detects the nitrogen or other substances of interest within the target which is at a distance of at least 5 meters remote from a source of the thermal neutrons and the location of gamma ray detection.

71. The method of claim 37, wherein the method detects a target comprising a body of explosive material measuring at least 120 mm in diameter and 350 mm in length, at a distance at least 10 meters remote.

* * * * *